(12) United States Patent
Wang

(10) Patent No.: US 9,670,305 B2
(45) Date of Patent: Jun. 6, 2017

(54) POLYURETHANE DISPERSANT AND THE METHOD FOR ITS PREPARATION

(71) Applicant: Zhijun Wang, Shanghai (CN)

(72) Inventor: Zhijun Wang, Shanghai (CN)

(73) Assignees: Zhijun Wang, Shanghai (CN); AFCONA CHEMICALS (HAIMEN) CO., LTD., Shanghai (CN)

( * ) Notice: Subject to any disclaimer, the term of this patent is extended or adjusted under 35 U.S.C. 154(b) by 0 days.

(21) Appl. No.: 14/394,741

(22) PCT Filed: Oct. 8, 2012

(86) PCT No.: PCT/CN2012/001356
§ 371 (c)(1),
(2) Date: Oct. 16, 2014

(87) PCT Pub. No.: WO2013/155652
PCT Pub. Date: Oct. 24, 2013

(65) Prior Publication Data
US 2015/0065676 A1     Mar. 5, 2015

(30) Foreign Application Priority Data
Apr. 16, 2012 (CN) .......................... 2012 1 0109581

(51) Int. Cl.
| | |
|---|---|
| *C08G 18/28* | (2006.01) |
| *C08G 18/79* | (2006.01) |
| *C08G 18/78* | (2006.01) |
| *C08G 18/42* | (2006.01) |
| *C08G 18/48* | (2006.01) |
| *C09D 17/00* | (2006.01) |

(52) U.S. Cl.
CPC ......... *C08G 18/283* (2013.01); *C08G 18/284* (2013.01); *C08G 18/285* (2013.01); *C08G 18/2865* (2013.01); *C08G 18/2875* (2013.01); *C08G 18/4277* (2013.01); *C08G 18/4833* (2013.01); *C08G 18/7887* (2013.01); *C08G 18/79* (2013.01); *C08G 18/792* (2013.01); *C08G 18/795* (2013.01); *C09D 17/003* (2013.01); *C09D 17/004* (2013.01)

(58) Field of Classification Search
CPC .. C08G 18/283; C08G 18/284; C08G 18/285; C08G 18/2865; C08G 18/2875; C08G 18/795; C08G 18/792; C08G 18/79; C08G 18/4833; C08G 18/4277; C08G 18/7887; C09D 17/003; C09D 17/004
See application file for complete search history.

(56) References Cited

U.S. PATENT DOCUMENTS

| 4,647,647 A * | 3/1987 | Haubennestel ....... B01F 17/005 525/440.02 |
| 5,399,294 A * | 3/1995 | Quednau ............... B01F 17/005 516/31 |

\* cited by examiner

*Primary Examiner* — Rabon Sergent
(74) *Attorney, Agent, or Firm* — Kening Li; Miller Canfield

(57) ABSTRACT

The present invention is related to a polyurethane dispersant and a preparation method thereof. The polyurethane dispersant is terminated by a nitrogen-containing heterocyclic compound during synthesis. The nitrogen-containing heterocyclic compound is prepared by subjecting anhydride and a compound containing a primary amine and a secondary amine or a hydroxyl or mercapto group to dehydration condensation. The condensed product is the nitrogen-containing heterocyclic compound, containing a reactive hydrogen. The structural formula of the compound containing the primary amine and the secondary amine or hydroxyl or mercapto group is shown as follows:

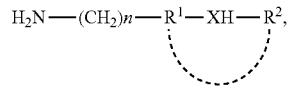

wherein n=1 to 5, and preferably 2 to 4, $R^1$ and $R^2$ are respectively alkyls containing 1 to 8 carbons, $R^1$ and $R^2$ are independent of each other or connected by a chemical bond to form one or more saturated or unsaturated 4-member to 8-member rings, and X represents N, O, or S.

11 Claims, 1 Drawing Sheet

POLYURETHANE DISPERSANT AND THE METHOD FOR ITS PREPARATION

FIELD OF THE INVENTION

The present invention relates to a new polyurethane dispersant and the method for its preparation. Said polyurethane dispersant is produced by the reaction between isocyanate polymers and hydroxyl compounds and the products are terminated by the self made anchoring terminal groups. The present invention relates further to a method for producing the new anchoring terminal group as well as its use in the polyurethane dispersant.

BACKGROUND

Great mechanical power is needed when solid particles are introduced into liquid medium. In addition, after the solid particles are dispersed into the liquid medium, they are attached to each other and can re-congregate due to London force/van der waals force, and hence the stability of the dispersion is destroyed. Therefore, a dispersant is often introduced to improve the efficiency when solid particles enter liquid medium and to enhance the stability of the dispersion.

A dispersant is a surfactant which possesses both hydrophobicity and hydrophilicity in the molecule. A part of its structure has an anchoring group with relatively high polarity that can be easily attached onto the surface of the solid particles, whereas the other part is a long molecular chain with relatively low polarity, which has high affinity to the dispersion medium (solvent or resin). Therefore, the dispersant can evenly disperse the solid particles of inorganic or organic paint which are difficult to be dissolved into liquid. In the meantime, it can also prevent the solid particles from sedimentation and congregation, and promote a relatively stable suspension.

With the wide application of organic paint and carbon black in the field of painting, ink and plastics, high molecular weight dispersants, such as polyacrylic ester or polyurethane, has become an indispensable additive to fundamentally improve the stability of these paints in the liquid. Since polyurethane has a special polymeric isocyanate core and high reactive activity with NCO, it can react with mono alcohols with different polarities and form steric chain segments, and therefore it can easily improve the stability of organic paint. It is no longer problem for a high molecular dispersant with high compatibility to have a stable dispersion of organic paint with high qualities.

U.S. Pat. No. 4,032,698 mentions a kind of polyurethane dispersant which is prepared using isocyanate polymers with 2.5 to 6 functionalities, monohydroxyl compounds of polyacrylic ester and anchoring terminal groups, wherein the anchoring terminal groups are alkalic reactants having —SH, —OH or —NH$_2$ or other reactive groups, such as dicyandiamide, dinitraniline, diaminomaleonitrile, 3-amino-1,2,3 triazole, etc.

EP154678 discloses a polyurethane dispersant, which is prepared using isocyanate polymers, hydroxyl compounds, and a compound containing a zerewitinoff reactive hydrogen and at least an alkalic group with nitrogen. This reactive hydrogen containing compound used as anchoring terminal group is preferably —NH$_2$ containing heterocyclic compounds, such as 1-(2-Aminoethyl)piperazine, 3-amino-1,2,4-triazole, 4-(2-aminoethyl)-pyridine, etc.

WO97/26984 discloses a polyurethane dispersant. Besides isocyanate polymers and hydroxyl compounds, the anchoring terminal group used is a Michael addition product, such as the addition product of a heterocyclic compound that contains reactive hydrogen and hydroxy-propyl (ethyl) acrylate, or the addition product of a heterocyclic product containing reactive hydrogen and glycidyl ether.

The polyurethane dispersant in CN200780044910 also uses a Michael addition anchoring terminal group to react with alkylaminoalkylamine and α,β-unsaturated carbonyl compound containing hydroxyl group.

The polyurethane dispersant in EP2007/05145 uses unsaturated mono hydroxyl compound as anchoring terminal group, such as propargyl alcohol, furfurylalcoho, etc, and the final product does not have amine value.

The polyurethane dispersants above use different kinds of anchoring terminal groups, which can disperse inorganic and part of organic paints well. However, to certain organic paint, such as cyanine. Isoindoline and carbon black, there exist still the drawbacks of low coloring strength and low stability of storage.

SUMMARY OF THE INVENTION

The present invention provides a new polyurethane dispersant and the method for its preparation to solve the above mentioned problems which exist in the state of the art. The solution is as follows:

The present invention provides a new polyurethane dispersant, characterized in that the polyurethane dispersant is terminated by a nitrogen-containing heterocyclic compound during synthesis. The nitrogen-containing heterocyclic compound is prepared by subjecting anhydride and a compound containing a primary amine and a secondary amine or a hydroxyl or mercapto group to dehydration condensation. The condensed product is the nitrogen-containing heterocyclic compound, containing a reactive hydrogen. The structural formula of the compound containing the primary amine and the secondary amine or hydroxyl or mercapto group is shown as follows:

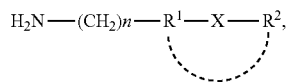

wherein n=1 to 5, and preferably 2 to 4, R$^1$ and R$^2$ are respectively alkyls containing 1 to 8 carbons, R$^1$ and R$^2$ are independent of each other or connected by a chemical bond to form one or more saturated or unsaturated 4-member to 8-member rings, and X represents N, O, or S.

The above mentioned method to produce the new polyurethane dispersant contains the following steps:

first, group A reacts with group B in a mixture solution of dimethyl benzene and butyl acetate with the catalyst DBTDL under a temperature of 70 to 80° C., wherein group B is used to close 1-90% of the —NCO group in group A.

then group C is added and the reaction is continued at 70-80° C., wherein group C closes 5-80% of the —NCO group of the A group, and the total amount of the —NCO group closed by group B and group C is 30-90%, last, the reaction mixture is kept warm under 50-60° C. and group D is used to close the rest of the —NCO group in group A, wherein group A is one or a plurality of isocyanate polymers with an average functionality of 2.0 to 6.0, group B are monohydroxyl compounds of polyether or polyester or polyacrylic ester, group C is a chain extender of two functionalities and
group D is a nitrogen-containing heterocyclic compound.

For example, the isocyanate polymers in group A is hexamethylene diisocyanate (HDI), toluene diisocyanate (TDI), isophorone diisocyanate (IPDI), Diphenyl-methane-diisocyanate (MDI), o-xyleneDiisocyanate (XDI), dicyclohexylmethylmethane-4,4'-diisocyanate ($H_{12}$MDI), 1,4-butanediisocyanate (BDI), 1, 8-Diisocyanatooctane (ODI) and other addition products of isocyanate, preferably HDI, TDI, IPDI and XDI. For example, the pentamer of the cyclization reaction product of toluene diisocyanate (commercial name Desmodur IL) is:

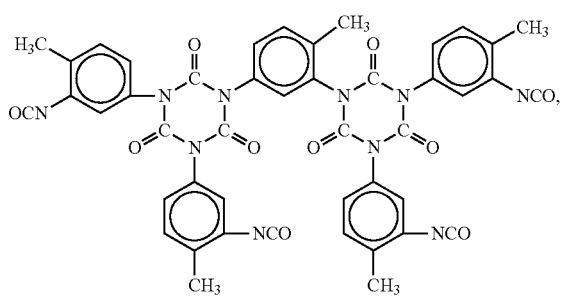

and the
self cyclization product of IPDI and TDI is:

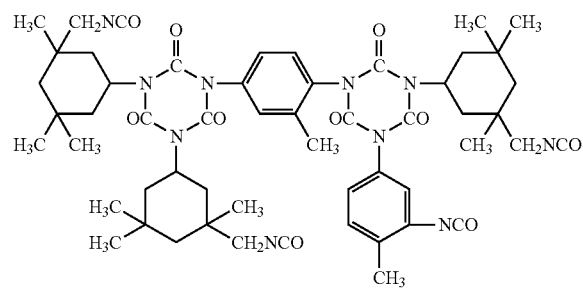

These polymers of isocyanate have an average functionality of 2.0 to 6.0. Suitable polymers can be purchased from the German company Bayer, or from the Italian company Sapici.

Group B of the present invention can be any kind of mono hydroxyl compound in the state of the art, preferably the monohydroxyl compounds of polyether, polyester or polyacrylic ester.

In general, group B terminates 1-90% of the —NCO group in group A, preferably, 15-60% of the —NCO group.

The above mono hydroxyl compound, namely mono alcohol of the polyesters, can be obtained by ring opening by small molecule mono alcohols of lactones. The small molecule mono alcohols can be any kind of alcohol containing 4-30 carbon atoms, preferably 4-18 carbons, such as butanol, pentanol, octanol, cyclohexanol, oleic alcohol, propargyl alcohol, etc. The lactones can be β-Propiolactone, valerolactone, caprolactone and their derivatives. The polymerization of the inner esters and the mono alcohols can be prepared by known methods. For example, it can be obtained by catalytic ring opening reaction of toluenesulfonic acid or dibutyl tin laurate, zirconium tetrabutoxide at 100-180° C. The ring opening reaction equation of the small mono alcohol molecule and caprolactone is as follows:

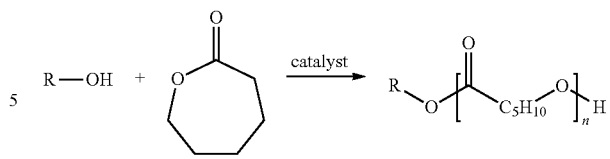

The poly-monoalcohol can also be obtained by polycondensation of small molecule mono alcohols, diols, dicarboxylic acids and anhydrides, and can also be obtained by polycondensation of small molecule mono alcohols and hydroxyl acids, or a combination of these two methods.

The monohydroxyl compounds of the polyester have a number-average molecular weight of 300 to 5000, preferably 1000-3000.

The above mentioned mono hydroxyl compounds of polyether, namely the monoalcohols of polyether, are preferably poly-monoalcohol ($C_{2-4}$ epoxy alkyls). It can be obtained through polymerization of small molecule monoalcohols and the monomers of $C_{2-4}$ epoxy alkyls. The small molecule mono alcohols therein contain 1-30 carbons, preferably 1-10 carbons, most preferably 1-4 carbons, and can be methanol, ethanol, propanol, butanol, 1-pentanol, 1-hexanol, 1-octanol, lauryl alcohol, benzyl alcohol, methyl phenol, nonyl phenol, dodecyl phenol, etc. The alkyl group of the $C_{2-4}$ epoxy alkyls can be linear or contain branches, such as epoxy ethane, propylene oxide, butyl oxide linkage, tetrahydrofuran or their polymers.

The monohydroxyl compounds of the polyether have a number-average molecular weight of 300 to 6000, preferably 1000-4000.

The mono alcohol of the polyacrylic ester is a polymer based on poly(methyl)acrylic ester which has a hydroxyl group on its tail. This polymer can be produced using monomer (methyl) polyacrylic ester $CH_2=C(CH_3)C(=O)OR$ under the telomerization of 2-mercaptoethanol with a normal initiator (such as AIBN), wherein R is an akyl group with 1 to 18 carbons, preferably 1-12 carbons, and most preferably 1-4 carbons. The reaction equation is as follows:

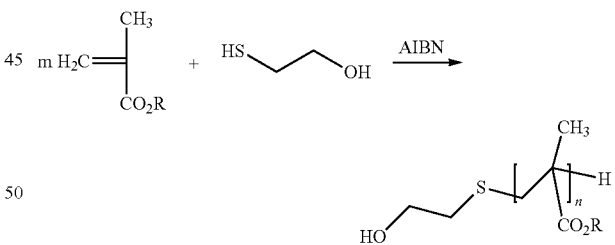

The number-average molecular weight of the polyacrylic ester is 300 to 20000, preferably 500 to 10000.

Said mono hydroxyl compound of the polyether is preferably poly-monoalcohol ($C_{2-4}$ epoxy alkyls), and can be obtained by ring opening polymerization of small molecule mono alcohol or mono carboxylic acid with $C_{2-4}$ epoxy alkyls monomers.

The hydroxyl compound of polyacrylic ester is prepared using monomer (methyl) polyacrylic ester $CH_2=C(CH_3)C(=O)OR$ under the telomerization of 2-mercaptoethanol with a normal initiator, wherein the number-average molecular weight is 300 to 20000, preferably 500 to 10000, wherein R is an akyl group with 1 to 18 carbons, preferably 1-12 carbons, most preferably 1-4 carbons.

Bifunctional chain extenders of may be a diol, diamine, or dicarboxylic acid with an average molecular weight of 600 to 2000, preferably polyalkoxylated diol, polyester diol, wherein the alkoxy group of polyalkoxylated diol contain 2-4 carbons, and can be polyethyleneglycol, polypropylene glycol, polytetrahydrofuran glycol, polybutylene glycol, preferably polyethyleneglycol, polypropylene glycol and their mixed diols. Group C terminates 5-80% of the —NCO group in group A, preferably 15-30%. The suitable amount of —NCO group in group A which is terminated by B and C group is 30-90%.

A method to prepare the nitrogen-containing heterocyclic compound is as follows:

the anhydride and the compound which contains a primary amine and a secondary amine or a hydroxyl group or a hydrosulfide group with a molar ratio of 1:1 react to produce a nitrogen-containing heterocyclic compound at 180 to 230° C. in a dehydration condensation reaction, the reaction product is the nitrogen-containing heterocyclic compound contains a reactive hydrogen, wherein the compound which contains a primary amine and a secondary amine or a hydroxyl group or a hydrosulfide group has the following structure:

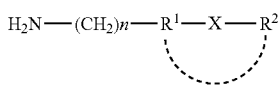

Wherein n=1-5, $R^1$ and $R^2$ are akyl groups with 1 to 8 carbons, wherein these two are either independent from each other or are linked with each other through chemical bonds and form a saturated or unsaturated 4- to 8-member rings and, X is N, O or S.

Said anhydride is selected from phathalic anhydride, tetrahydrophthalic anhydride, methyl tetrahydrophthalic anhydride, chlorophthalic anhydride, bromophthalic anhydride, fluorophthalic anhydride, methylphthalic anhydride, Naphthalene anhydride, or 2,3-Naphthalenedicarboxylic Anhydride.

The nitrogen-containing heterocyclic compound is 3-(2-aminoethyl)indole, 4-(2-aminoethyl)phenylmethanol, 1H-Imidazole-4-ethanamine, 4-(hydroxyphenyl)ethylamine, 2-(2-aminoethyl) phenol, 2-methylindole-3-ethylamine, n-ethyl-ethylenediamine, N-Phenylethylenediamine, 3-amino-1-methylpyrazole, 2-(aminomethyl)morpholine, 5-(aminomethyl)indole, 4-(aminomethyl) benzalcohol, 5-aminomethylindazole, 2-(2-aminopropyl)pyrrole, 4-(2-aminopropyl)phenol, 1-(2-aminoethyl)piperazine, 4-methyl-5-aminoindole, 5-aminolsoindoline, 1-amino-4-hydroxlanthraquinone, 4-aminobenzimidazolinone, 4-amino-3-mercaptopyridine, 2-mercaptobenzimidazole or 2-(2-aminoethyl)phenol.

Preferably such nitrogen containing heterocyclic compound is 4-aminobenzimidazolinone, 3-(2-aminoethyl)indole, 2-(aminomethyl)morpholine, or 1-(2-aminoethyl)piperazine. For example, they have the following structures:

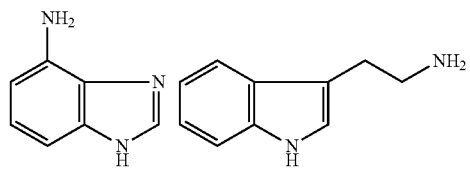

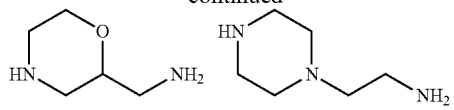

The polycondensation reaction used to prepare group D can be carried out according to known methods in the art. Preferred method is: an anhydride and a heterocyclic compound with a certain molar ratio are added and a dehydration reaction is carried out at 180-230° C. Finally, one or more polar solvent mixture is used for dilution, such as isobutyl alcohol, propylene glycol mono-methyl ether, cyclohexanone, MIBK, NMP, to form group D of the present invention.

One possible structure of group D is: The dehydration condensation product of phthalic anhydride and 3-(2-aminoethyl)indole, 2-((3-indole)ethyl) isoindole-1,3-diketone:

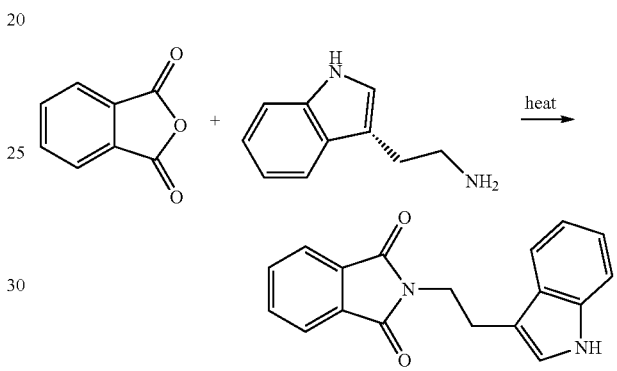

Another possible structure of group D is the dehydration condensation product of phthalic anhydride and 1-(2-aminoethyl)piperazin, 2-((1-piperazin)ethyl) isoindole-1,3-diketone:

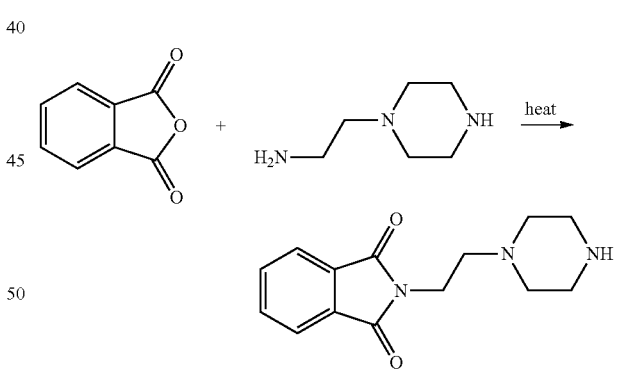

The polyurethane dispersant of the current invention can be used for the dispersion of pigments and fillers in paint and ink, such as metal oxide pigments, e.g. titanic oxide, iron oxide and zinc oxide of all kinds of colors. Fillers such as talcum, kaolin, silicon oxide, and barite. Suitable organic paints includes benzimidazolone, azos, quinacridone, perylene, anthraquinone, isoindoline, DPP and carbon black, etc.

The special structure of the dispersant of the present invention is based on self made anchoring terminal group of the current invention, a very good dispersion effect and a very good stabilizing effect to organic paints, such as azos, isoindoline and carbon black can be achieved. The drawbacks in the state of the art such as low coloring power, and low stability can be overcome.

DESCRIPTION OF THE PREFERRED EMBODIMENT

Figure 1:
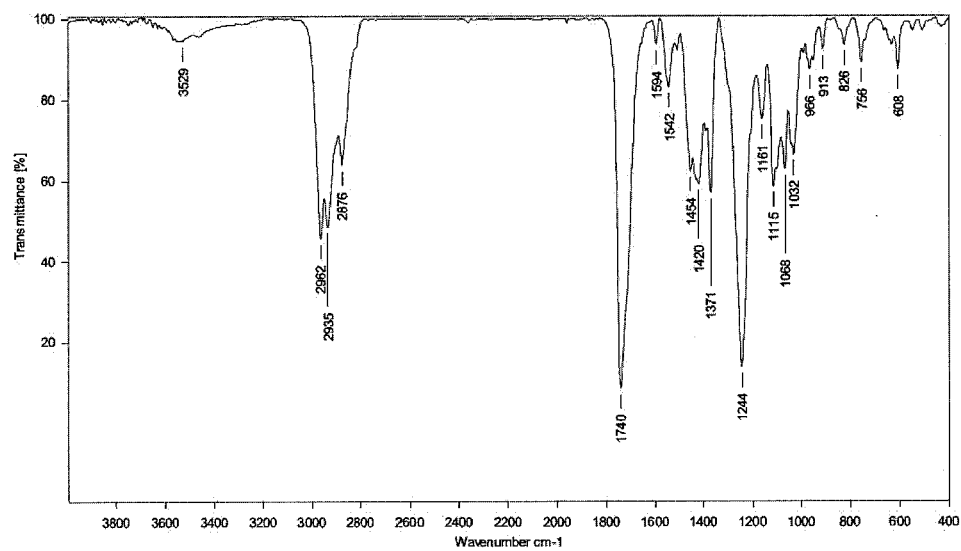
FIG. 1 is the IR spectrum of the product in Example 2.
Figure 2:
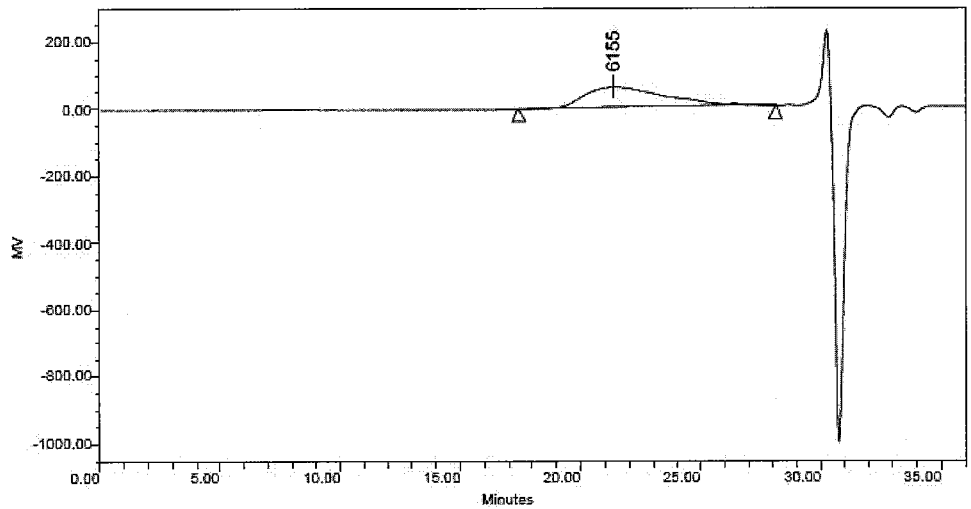
FIG. 2 is the GPC spectrum of the product in Example 2.

The current invention is further illustrated by the following examples which do not limit the scope of protection of the current invention.

Example 1

Preparation of Group B:

The polyester mono alcohol B1 (the molar ratio of the reactants is: octanol:ε-caprolactone=1:14.65, Mn=1800).

Under the protection of nitrogen, octanol (7.24 portion, 0.056 mol) and ε-caprolactone (92.76 portion, 0.814 mol) are added. With stirring, the temperature is increased to 110° C. Dibutyltin dilaurate (DBTDL, 0.03 portions, 10% of the butanol solution) is added and the temperature has increased to 170-180° C. and be maintained for 6 hours and white wax formed solid body under room temperature is formed with a hydroxyl value of 32. This is polyester mono alcohol B1 with a number average molecular weight of 1800.

The polyester mono alcohol B2 (the molar ratio of the reactants is: octanol:ε-caprolactone=1:8.67, Mn=1600). Its preparation method is the same as that for B1, wherein a transparent liquid is obtained, with a hydroxyl value of 35 and a number average molecular weight of 1600.

The polyester mono alcohol B3 (MMA:mercaptoethanol: AIBN=142:7.25:1, Mn=2000): Two dropwise addition kettle are prepared in advance, wherein they hold the following components respectively: Group A: methyl methacrylate (57 portions, 0.569 mol), group B: a mixture of 2-mercaptoethanol (2.33 portions, 0.029 mol), azodiisobutyronitrile (0.67 portions, 0.004 mol) and acetic ether (20 portions). Under the protection of nitrogen, acetic ether (20 portions) is added and the temperature is increased to the reflux temperature, and group A is started to be added dropwise. After half an hour, group B is started to be added and is finished after 200 minutes. After the addition, the temperature is kept at 80° C. until the solid body achieves its standard. Finally, the temperature is increased to 120° C., and the solvent is removed under vacuum. The solid body produced is light yellow, and transparent, with a hydroxyl value of 27.50, and a number average molecular weight of 2000.

Polyether mono alcohol B4 (MPEG 2000, Mn=2000), B4 is a commercial product with a hydroxyl value of 28 and is a white wax solid body under room temperature.

Polyether mono alcohol B5 (beta-butoxy EO:PO=1:1 mono alcohol, Mn=1000), B5 is a commercial product with a hydroxyl value of 56, and is a transparent liquid under room temperature.

Preparation of group C: diol C1 (molar ratio of the reactants is butanediol:ε-caprolactone: δ-valerolactone=1: 5.46:0.94, Mn=00). Under the protection of nitrogen, 1,4-butanedil (11.20 portions, 0.124 mol), ε-caprolactone (77.22 portions, 0.677 mol), δ-valerolactone (11.58 portions, 0.116 mol) are added. The mixture is stirred until the temperature increases to 130° C. Zirconium tetra-n-butoxy is then added (0.3 portions, 30% butanol solution). The temperature is then increased to 175-180° C. and be maintained for more than 6 hours until the solid body obtained achieves its standard. A wax like solid body is obtained with a hydroxyl value of 141 and a number average molecular weight of 800.

Diol C2 (molar ratio of the reactants is PEG 200:ε-caprolactone=1:10.53, Mn=1400): The procedure is the same as that for C1. White wax-like solid body is achieved, with a hydroxyl value of 40 and a number average molecular weight of 1400.

Diol C3 (PEG 800, Mn=800): C3 is a commercial product, with a hydroxyl value of 140, and is a white, wax-like solid body.

Preparation of Group D:

The anchoring terminal group D1 (the molar ratio of the reactants is: phathalic anhydride:4-aminobenzimidazole=1: 1). Under the protection of nitrogen, phathalic anhydride (52.66 portions, 0.356 mol), 4-aminobenzimidazole (47.34 portions, 0.356 mol) are added and the temperature is gradually increased to 180° C. and is maintained until the acetic value is stable. The temperature is then increased to 220-230° C., and maintained until the acetic value is less than 1. The temperature is then decreased to 80° C. NMP is used to dilute the solution to 50% until a light brown color is obtained. This is the anchoring terminal group D1.

The anchoring terminal group D2 (the molar ratio of the reactants is: phathalic anhydride:3-(2-aminoethyl)indole=1: 1). The method is the same as the method for the preparation of D1, wherein 3-(2-aminoethyl)indole is used to replace 4-aminobenzimidazole, and a 50% light brown liquid is obtained. This is the anchoring terminal group D2. EIMS shows that D1 has a molecular weight of 259.9.

The anchoring terminal group D3 (the molar ratio of the reactants is: phathalic anhydride:1-(2-aminoethyl) piperazin=1:1). The method is the same as the method for the preparation of D1, wherein 1-(2-aminoethyl) piperazin is used to replace 4-aminobenzimidazole, and a 50% light brown liquid is obtained. This is the anchoring terminal group D3.

The anchoring terminal group D4 (the molar ratio of the reactants is: 2,3-naphthalenedicarboxylic anhydride:2-(aminomethyl)morpholine=1:1). The method is the same as the method for the preparation of D1, wherein 2-(aminomethyl)morpholine is used to replace 4-aminobenzimidazole, and a 50% light brown liquid is obtained. This is the anchoring terminal group D4.

Preparation of Polyurethane Dispersant

Control example 1: Under the protection of nitrogen, 21.63 portions of Desmodur IL (51% butyl acetate solution, product from Bayer), 24.52 portions of mixed solution (dimethyl benzene:butyl acetate=4:1), 24.33 portions of mono alcohol B1 and 0.1 portion of DBTDL (10% butyl acetate solution), have the temperature increased to 70° C., and be maintained to the extent when NCO is stable. 1.7 portion of diol C1 is added, the temperature is maintained until NCO is stable. A mixture of 3.09 portions of 4-(2- aminoethyl) pyridine and 24.72 portions of propylene glycol mono-methyl ether acetate (MPA) is added and kept warm under the temperature of 60° C. The solid body obtained contains 40% light yellow liquid with certain viscosity, and has an amine value of 10.2.

Control example 2: Under the protection of nitrogen, 12.2 portions of Desmodur N (75% butyl acetate:dimethyl benzene=1:1 solution, product from Bayer), 22.65 portions of mixed solution (dimethyl benzene:butyl acetate=1:1), 28.75 portions of mono alcohol B2 and 0.1 portion of DBTDL (10% butyl acetate solution), have the temperature increased to 70° C., and be maintained to the extent when NCO is stable. 1.57 portion of polyethyleneglycol 800 (PEG 800) is added, the temperature is maintained until NCO is stable. A mixture of 12.2 portions of 3-benzimidazol-1-propionic acid-2-hydroxyethyl acrylate (50% NMP solution, it is the Michael addition product of benzimidazole and hydroxyethyl acrylate. Its production method is according to the mature method in state of the art.) and 22.65 portions of MPA has its temperature increased to 60° C. and maintained for 1 hour. The solid body obtained contains 45% light yellow liquid with certain viscosity, and has an amine value of 13.2.

Example 2

The preparation method of polyurethane dispersant is the same as control example 1. The difference lies in that Desmodur IL (19.02 portion), polyester mono alcohol B1 (23.38 portion), diol C1 (1.55 portion), anchoring terminal group D2 (11.10 portion) are used to replace the corresponding components, and the solid body contains 40% light yellow transparent liquid with certain viscosity. The amine value is 3.2. FIG. 1 is the IR spectrum of the products. FIG. 1 is the GPC spectrum of the products. The analytic result is listed in Table 1:

| Sample | Mn (Daltons) | Mw (Daltons) | Mp (Daltons) | Mz (Daltons) | Mz + 1 (Daltons) | Degree of Dispersion | Mz/Mw | Mz + 1/Mw |
|---|---|---|---|---|---|---|---|---|
| 1 | 2811 | 5454 | 6155 | 8266 | 11200 | 1.9407 | 1.5155 | 2.0534 |

Example 3

The preparation method of polyurethane dispersant is the same as control example 1. The difference lies in that Desmodur IL (17.81 portion), polyester mono alcohol B1 (23.75 portion), PEG 2000 (2.23 portion), anchoring terminal group D1 (10.39 portion) are used to replace the corresponding components, and the solid body contains 40% light yellow transparent liquid with certain viscosity. The amine value is 5.8.

Example 4

The preparation method of polyurethane dispersant is the same as control example 1. The difference lies in that Desmodur IL (19.66 portion), polyester mono alcohol B2 (22.33 portion), PEG 2000 (2.21 portion), anchoring terminal group D3 (11.14 portion) are used to replace the corresponding components, and the solid body contains 40% light yellow transparent liquid with certain viscosity. The amine value is 12.5.

Example 5

The preparation method of polyurethane dispersant is the same as control example 1. The difference lies in that Desmodur IL (20.78 portion), polyester mono alcohol B3 (21.76 portion), PEG 2000 (1.39 portion), anchoring terminal group D2 (12.12 portion) are used to replace the corresponding components, and the solid body contains 40% light yellow transparent liquid with certain viscosity. The amine value is 3.5.

Example 6

The preparation method of polyurethane dispersant is the same as example 2. The difference lies in that Desmodur N (11.92 portion), polyester mono alcohol B2 (27.74 portion), PEG 1000 (1.53 portion), anchoring terminal group D3 (13.62 portion) are used to replace the corresponding components, and the solid body contains 45% light yellow transparent liquid with certain viscosity. The amine value is 4.8.

Example 7

The preparation method of polyurethane dispersant is the same as control example 2. The difference lies in that Desmodur N (13.32 portion), polyester mono alcohol B5 (25.21 portion), PEG 2000 (3.53 portion), anchoring terminal group D1 (12.0 portion) are used to replace the corresponding components, and the solid body contains 45% light yellow transparent liquid with certain viscosity. The amine value is 13.3.

Example 8

The preparation method of polyurethane dispersant is the same as control example 2. The difference lies in that Desmodur HL (15.35 portion, 60% butyl acetate solution, product from bayer), polyester mono alcohol B1 (23.37 portion), PEG 800 (1.34 portion), anchoring terminal group D2 (12.02 portion) are used to replace the corresponding components, and the solid body contains 40% light yellow transparent liquid with certain viscosity. The amine value is 3.8.

Example 9

The preparation method of polyurethane dispersant is the same as control example 2. The difference lies in that Desmodur HL (13.72 portion), polyester mono alcohol B4 (25.03 portion), diol C2 (1.34 portion), anchoring terminal group D3 (10.37 portion) are used to replace the corresponding components, and the solid body contains 40% light yellow transparent liquid with certain viscosity. The amine value is 4.5.

The Test Results of the Present Invention

In order to assess the dispersion property of the polyurethane dispersant according to the present invention, a corresponding graining paste is prepared. The stability of the graining paste is assessed and it is added into a resin and its coloring capability is determined. The result is shown as follows:

The above graining paste is made to paint using the ratio of hydroxy acrylic resin:graining paste:solidifier:mixed solvent 5:3:2.5:1.5. The method for production is as follows: hydroxy acrylic resin is mixed with the graining paste and the dispersion is carried out in a high speed stirring machine (5000 rpm*3 min). Solvent and solidifier is added and stirred with hand. After filtration, it is painted onto polyester chips and dried under room temperature. The luster of the chips is shown as follows:

TABLE 2 the formulation of the graining paste (weight ratio)

| Component | | Graining PasteI | Graining PasteII | Graining PasteIII | Graining PasteIV | Graining PasteV | Graining PasteVI |
|---|---|---|---|---|---|---|---|
| hydroxy acrylic resin (NV = 60%) | | 31 | 31 | 31 | 30 | 30 | 30 |
| Dispersant | Control 1 | 15 | / | / | / | / | / |
| | Example 2 | / | 15 | / | / | / | / |
| | Example 4 | / | / | 15 | / | / | / |
| | Example 2 | / | / | / | 8.9 | / | / |
| | Example 6 | / | / | / | / | 8.9 | / |
| | Example 7 | / | / | / | / | / | 8.9 |
| Pigment Yellow 110 | | 15 | 15 | 15 | / | / | / |
| FW200 | | / | / | / | 10 | 10 | 10 |
| Mixed solvent | | 39 | 39 | 39 | 51.1 | 51.1 | 51.1 |
| Total | | 100 | 100 | 100 | 100 | 100 | 100 |

Table 2 shows the graining pastes containing polyurethane dispersant of the current invention and a control dispersant respectively. The method for production is as follows: In the shaking bottle, dispersant, a mixture of dimethylbenzene and propylene glycol monomethyl ether acetate with a ratio of 1:1, pigment and resin are added sequentially and mixed by stirring. Finally glass balls are added (diameter 2-3 mm). The dispersion is carried out in a shaking machine for 2 hours and the graining paste is thus obtained.

Table 3 shows the viscosity of the graining paste and its stability under 50°

TABLE 4

| | paint luster data | | | | | |
|---|---|---|---|---|---|---|
| | paint I | paint II | paintIII | paintIV | paint V | paintVI |
| 20 degree luster | 88 | 91 | 92 | 85 | 90 | 91 |

According to table 3 and 4, in comparison with traditional polyurethane dispersant, the polyurethane dispersant of the current invention uses a new anchoring terminal group and therefore has an enhanced adsorption ability to pigment. As

TABLE 3

Viscosity of graining paste and its thermostability

| | | Graining Paste I | Graining Paste II | Graining Paste III | Graining Paste IV | Graining Paste V | Graining Paste VI |
|---|---|---|---|---|---|---|---|
| viscosity*(5turn) | | 994.2 | 196.8 | 238.2 | 921.7 | 211.2 | 180.5 |
| viscosity(50turn) | | 164.7 | 125.3 | 124.3 | 182.3 | 115.0 | 100.1 |
| 50° C. thermostabiltiy | After one week | stable | stable | stable | stable | stable | stable |
| | After two weeks | Little clear liquid in the upper layer | stable | stable | Little clear liquid in the upper layer | stable | stable |
| | After three weeks | Clear liquid in the upper layer increases | Little clear liquid in the upper layer | stable | Clear liquid in the upper layer increases | stable | stable |
| | After four weeks | Small number of particle precipitate | Small number of particles precipitates | Small number of particles precipitates | Small of number of particles precipitates | Small amount of clear liquid in the upper layer | Small amount of clear liquid in the upper layer |

*BROOKFIELD RVDV-I viscosity meter a result, the viscosity of the graining paste (II, III, V, VI) decreases significantly and its stability under 50° C. is improved. Furthermore, due to the increased adsorption ability of the anchoring terminal group, the dispersant can better stabilize the released pigment particles and thus overcome the reconglomeration phenomenum among the pigment particles due to vann der Waals force. The pigment can be dispersed into even smaller particle diameter. Therefore, the luster data have been improved and the coloring effect is enhanced.

What is claimed is:

1. A polyurethane dispersant, which is terminated by a nitrogen-containing heterocyclic compound during synthesis, wherein the nitrogen-containing heterocyclic compound is prepared by subjecting anhydride and a compound containing a primary amine and a secondary amine or a hydroxyl or mercapto group to dehydration condensation, and the condensed product is the nitrogen-containing heterocyclic compound, containing a reactive hydrogen, and the compound containing the primary amine and the secondary amine or hydroxyl or mercapto group is selected from the group consisting of 3-(2-aminoethyl)indole, 4-(2-aminoethyl)phenylmethanol, 1H-imidazole-4-ethanamine, 2-(2-aminoethyl)phenol, 2-methylindole-3-ethylamine, N-ethyl-ethylenediamine, N-phenylethylenediamine, 3-amino-1-methylpyrazole, 2-(aminomethyl)morpholine, 5-(aminomethyl)indole, 4-(aminomethyl)benzalcohol, 5-aminomethylindazole, 2-(2-aminopropyl)pyrrole, 4-(2-aminopropyl)phenol, 1-(2-aminoethyl)piperazine, 4-methyl-5-aminoindole, 5-aminoisoindoline, 1-amino-4-hydroxylanthraquinone, 4-aminobenzimidazolinone, or 4-amino-3-mercaptopyridine.

2. A method to produce the polyurethane dispersant of claim 1, wherein the method comprises:
    reacting a Group A reactant comprising an isocyanate (—NCO) group with a Group B reactant in a mixture of dimethyl benzene and butyl acetate with dibutyltin dilaurate (DBTDL) as catalyst at a temperature of about 70 to 80° C., wherein 1-90% of the isocyanate groups of the group A reactant are reacted with the group B reactant,
    adding a group C reactant and continuing the reaction at about 70 to 80° C., wherein 5-80% of the isocyanate groups of the group A reactant are reacted with the group C reactant, and wherein the total amount of the isocyanate groups reacted with group B and group C reactants is about 30-90%, and
    maintaining the reaction mixture at about 50 to 60° C., and adding a group D reactant to react with the rest of the isocyanate groups in the group A reactant,
    wherein
    the group A reactant comprises one or a plurality of isocyanate polymers with an average functionality of 2.0 to 6.0,
    group B reactant comprises monohydroxyl compounds of polyether or polyester or polyacrylic ester,
    group C reactant comprises a chain extender of two functionalities, and
    group D reactant comprises a nitrogen-containing heterocyclic compound.

3. A method according to claim 2, wherein the monohydroxyl compounds are obtained by a ring opening reaction of lactones with mono alcohols, or by polycondensation of mono alcohols, diols, dicarboxylic acids and anhydrides, or by polycondensation of mono alcohols and hydroxyl acids, or a combination thereof.

4. A method according to claim 2, wherein the extender of two functionalities is a diol, diamine, or dicarboxylic acid with an average molecular weight of 600 to 2000.

5. A method according to claim 3, wherein the monohydroxyl compounds of the polyester have a number-average molecular weight of 300 to 5000, and the monohydroxyl compounds of the polyether have a number-average molecular weight of 300 to 6000.

6. A method according to claim 5, wherein the monohydroxyl compounds of the polyester have a number-average molecular weight of 1000 to 3000, and the monohydroxyl compounds of the polyether have a number-average molecular weight of 1000 to 4000.

7. A method according to claim 2, wherein monohydroxyl compounds of polyacrylic ester are prepared using (methyl) acrylic ester $CH_2\!\!=\!\!C(CH_3)C(\!\!=\!\!O)OR$ as a monomer under the telomerization of 2-mercaptoethanol with an initiator, wherein the number-average molecular weight is 300 to 20000, wherein R is an akyl group with 1 to 18 carbons.

8. The method according to claim 7, wherein the initiator is azobisisobutyronitrile (AIBN).

9. The method according to claim 7, wherein the number-average molecular weight is 500 to 10000.

10. The method according to claim 2, wherein the nitrogen-containing heterocyclic compound is prepared as follows:
    the anhydride and the compound which contains a primary amine and a secondary amine or a hydroxyl group or a mercapto group with a molar ratio of 1:1 react into the nitrogen-containing heterocyclic compound under 180 to 230° C. under dehydration condensation reaction, the reaction product is the nitrogen-containing heterocyclic compound with a reactive hydrogen, wherein the compound which contains a primary amine and a secondary amine or a hydroxyl group or a mercapto group is 3-(2-aminoethyl)indole, 4-(2-aminoethyl)phenylmethanol, 1H-imidazole-4-ethanamine, 2-(2-aminoethyl)phenol, 2-methylindole-3-ethylamine, N-ethyl-ethylenediamine, N-phenylethylenediamine, 3-amino-1-methylpyrazole, 2-(aminomethyl)morpholine, 5-(aminomethyl)indole, 4-(aminomethyl)benzalcohol, 5-aminomethylindazole, 2-(2-aminopropyl)pyrrole, 4-(2-aminopropyl)phenol, 1-(2-aminoethyl)piperazine, 4-methyl-5-aminoindole, 5-aminoisoindoline, 1-amino-4-hydroxylanthraquinone, 4-aminobenzimidazolinone, or 4-amino-3-mercaptopyridine.

11. The method according to claim 10, wherein the anhydride is phathalic anhydride, tetrahydrophthalic anhydride, methyl tetrahydrophthalic anhydride, chlorophthalic anhydride, bromophthalic anhydride, fluorophthalic anhydride, methylphthalic anhydride, naphthalene anhydride, or 2,3-naphthalenedicarboxylic anhydride.

* * * * *